United States Patent
Haberer et al.

(10) Patent No.: US 7,652,238 B2
(45) Date of Patent: Jan. 26, 2010

(54) METHOD AND APPARATUS FOR DETECTING AN OBJECT THROUGH THE USE OF MULTIPLE SENSORS

(75) Inventors: Manfred Haberer, Riegel (DE); Bernd Rothenberger, Breisach-Oberrimsingen (DE); Carsten Natzkowski, Freiburg (DE)

(73) Assignee: Sick AG, Waldkirch/Breisgau (DE)

( * ) Notice: Subject to any disclaimer, the term of this patent is extended or adjusted under 35 U.S.C. 154(b) by 0 days.

(21) Appl. No.: 11/208,364

(22) Filed: Aug. 19, 2005

(65) Prior Publication Data
US 2006/0049340 A1    Mar. 9, 2006

(30) Foreign Application Priority Data
Sep. 8, 2004    (DE) .................. 10 2004 043 515

(51) Int. Cl.
*G01C 21/02* (2006.01)
*G06M 7/00* (2006.01)
(52) U.S. Cl. ..................... 250/206.1; 250/221
(58) Field of Classification Search .......... 250/208.1, 250/221, 206.1, 206.2; 340/541, 555–557, 340/679, 680, 686.1, 686.6; 348/152–155, 348/42, 43, 46–48; 192/129 R, 129 A
See application file for complete search history.

(56) References Cited

U.S. PATENT DOCUMENTS
2001/0041077 A1* 11/2001 Lehner et al. ............... 396/661

FOREIGN PATENT DOCUMENTS
DE    41 13 992 A1    11/1992
DE    197 09 799 A1    9/1998
DE    100 49 366 A1    4/2002
EP    1 061 487    *  12/2000
EP    1 061 487 A1    12/2000

OTHER PUBLICATIONS

Andreas Meisel et al., "3-D Collision Avoiding Sensor Based on CCD Cameras", Sensor 91, Nuremberg, Germany, May 1991, pp. 155-170.
Peter Steinhaus et al., "3D Global and Mobile Sensor Data Fusion for Mobile Platform Navigation", International Conference on Robotics and Automation, Apr. 2004, pp. 1-6.
Wolfgang Niem, Robust and Fast Modelling of 3D Natural Objects from Multiple Views, SPIE Proceedings "Image and Video Processing II", vol. 2182, 1994, pp. 1-10.
Hiroshi Noborio et al., A Stereo Volume Intersection Method for Reconstruction of 3D Multiple Objects, International Conference on Automation, Robotics and Computer Vision, vol. 1, Sep. 1992, pp. 1-5.

* cited by examiner

*Primary Examiner*—Thanh X Luu
*Assistant Examiner*—Pascal M Bui-Pho
(74) *Attorney, Agent, or Firm*—Harness, Dickey & Pierce, P.L.C.

(57) ABSTRACT

A method for detecting an object inside a monitored zone includes monitoring at least a part of a monitored zone. Sensors generate respective single digital images of the total monitored zone, with the single images of all sensors being generated in a uniform coordinate system. Coordinate points of the single images are flagged as "safe" by each sensor if they are free of the object, with all other coordinate points being flagged as "unsafe". The single images are each transmitted to an evaluation unit and are superimposed to form a resulting total image. The coordinate points of the total image, which are flagged as "safe", correspond to those flagged as safe in at least one of the single images. All other coordinate points of the total image are flagged as unsafe. The coordinate points flagged as unsafe in the total image are used for the determination of the object coordinates.

12 Claims, 6 Drawing Sheets

Fig. 1

PRIOR ART

METHOD AND APPARATUS FOR DETECTING AN OBJECT THROUGH THE USE OF MULTIPLE SENSORS

CROSS-REFERENCE TO RELATED APPLICATIONS

This application claims the benefit of German Patent Application No. DE 10 2004 043 515.4, filed on Sep. 8, 2004. The disclosure of the above application is incorporated herein by reference.

FIELD AND BACKGROUND OF THE INVENTION

The present invention relates to a method for detecting an object inside a monitored zone, in which at least two sensors respectively monitor at least a part of the monitored zone. The invention is furthermore directed to an apparatus for use in a method of this type.

Methods of this type are in particular used in safety engineering. A check is, for example, made continuously whether an object, in particular a person, sensed inside the monitored zone, intrudes into the danger zone of a machine, for example a robot, working inside the monitored zone. If an intrusion of this type is detected, the machine can be switched off or another suitable safety function can be triggered.

When laser scanners designed as area sensors are used, a separate protected field is usually defined for each sensor with which the zone between the sensor and the machine is monitored for the intrusion of an object. The measured data of each sensor are each supplied separately to an evaluation unit which, for example, switches off the machine when a breach of the protected zone is recognized on the basis of the measured data supplied by a sensor by a comparison with pre-determined desired data. Since the measured data of the sensors are each determined in the respective sensor's own reference system as a rule and are transmitted to the evaluation unit, they must be transformed into the reference system of the evaluation unit prior to the carrying out of the comparison by the evaluation unit in accordance with the arrangement of the sensor and the data format used.

It is problematic in this process that a breach of the protected zone reported by a sensor does not necessarily mean that the sensed object is also breaching the danger zone of the machine. Since the sensor cannot see into the zone disposed between the object and the machine, it is not possible to differentiate whether the part of the object remote from the sensor reaches up to and into the danger zone of the machine or not. For safety reasons, the machine must therefore be switched off, when an object is sensed, even if there is actually no breach of the danger zone of the machine. The sensing of the object is thus incomplete with respect to its actual shape, since the "shadow" of the object lying between the object and the machine from the view of the sensor also has to be taken into account in the object sensing.

It is furthermore a disadvantage that a definition always has to be made up to the sensor due to the described cast shadow of the protected zone of the sensors so that a free definition of the protected zone inside the monitored space is not possible.

Finally, the computing time effort in the evaluation unit for the required coordinate transformation is relatively high so that high computing power is in particular required for a time-critical application when a plurality of sensors are used.

SUMMARY OF THE INVENTION

It is therefore the underlying object of the present invention to develop a method and an apparatus of the initially named kind such that a more precise sensing of objects is possible.

The object relating to the method is satisfied, starting from a method of the initially named kind, in that each sensor generates a single digital image of the total monitored zone, with the single images of all sensors being generated is a uniform coordinate sensor; in that those coordinate points of the single image generated by each sensor which the sensor has recognized as being free of the object are flagged as "safe"; in that all other coordinate points of the single images are flagged as "unsafe"; in that the single images generated in this manner are each transmitted to an evaluation unit; in that the transmitted single images are superimposed by the evaluation unit in accordance with their common coordinate system to form a resulting total image in that those coordinate points of the total image are flagged as "safe" which are flagged as "safe" in at least one of the single images transmitted by the sensors, whereas all other coordinate points of the total image are flagged as "unsafe"; and in that the coordinate points flagged as "unsafe" in the total image are used for the determination of the object coordinates.

The object relating to the apparatus is satisfied, starting from an apparatus of the initially named kind, in that each sensor is designed for the generation of a single digital image of the total monitored zone in a coordinate system uniform for all sensors and for the flagging as "safe" of those coordinate points of the single images generated by the sensor which it recognizes as free of the object; in that each sensor is connected to an evaluation unit for the transmission of the single images generated in this manner; in that the evaluation unit is designed for the superimposition of the transmitted single images in accordance with their common coordinate system to form a resulting total image, with it being possible for the evaluation unit to flag as "safe" those coordinate points of the total image which are flagged as "safe" in at least one of the single images transmitted by the sensors, whereas all other coordinate points of the total image can be flagged as "unsafe"; and in that the evaluation unit is designed for the determination of the object coordinates from the coordinate points flagged as "unsafe" in the total image.

In accordance with the invention, the "shadow zone" of the object can thus also be reliably recognized as such on the sensing of an object and can thus be classified as "safe" as long as at least one sensor can see into this shadow zone. Only the space of the monitored zone actually taken up by the object is accordingly classified as "unsafe" so that an optimum, and in particular minimized, sensing of the object inside the monitored zone is ensured.

A further advantage of the invention lies in the fact that the generation of the single images takes place in a uniform coordinate system for all sensors in that either all sensors operate in the same coordinate system from the start or the required transformation into the uniform coordinate system is carried out by each sensor itself. The load of the evaluation unit can thereby be substantially reduced so that the resulting process speed can be increased. The flagging as a safe or unsafe zone at the level of the sensors also effects a corresponding relief of the evaluation unit.

It is generally possible for only an explicit flagging of the safe coordinate points to take place, whereas the remaining coordinate points are not explicitly flagged as unsafe, but only implicitly by their "non-flagging".

In accordance with a preferred embodiment of the invention, the resulting total image is superimposed with a danger zone fixed by the evaluation unit and in particular changing dynamically and a safety-relevant function is triggered when at least a pre-determined number of coordinate points flagged as unsafe is determined inside the danger zone. In accordance with this embodiment, an evaluation of the object recognition is thus possible with respect to a pre-determined danger zone such as is defined, for example, in safety engineering for hazardous machinery. Depending on the application and in particular on the resolution used, the safety-relevant function can already be triggered on the determination of a single unsafe coordinate point or only with a plurality of such points inside the danger zone.

The danger zone can, for example, be the effective area of a machine, in particular of a robot, while the object to be sensed is formed by a person who is located inside the monitored zone and has to be protected against a dangerous contact with the robot. With the invention, a safety-relevant function, e.g. a switching off of the machine, is only triggered when the sensed object actually intrudes into the danger zone of the machine. If an object is sensed inside the monitored zone by a sensor such that the "shadow" of the object which can be seen into by the sensor comes to lie between the object and the machine, in accordance with the invention the safety-relevant function is not triggered as long as at least one of the sensors can seen into this shadow zone and thus classifies the coordinate points of this zone as "safe".

The single images of the different sensors preferably each have the same resolution (discretization). The superimposition of the pictures in the evaluation unit can thereby be accelerated since a further conversion inside the evaluation unit is not necessary. The computing effort in the processing of the pictures can thus be reduced so that the size of the required danger zone can be minimized since a shorter reaction time is achieved on the triggering of the safety-relevant function. Ultimately, an enlarging of the effective circle of the machine can thereby be achieved.

Advantageously, the common monitored zone is defined for each sensor in an initialization phase and its own position is fixed with respect to the monitored zone. A uniform reference system of all sensors and a uniform format of the sensor data which should be sent to the evaluation unit are guaranteed by this initialization phase. It is in particular important to fix the respective position of each sensor with respect to the monitored zone since the sensor data are no longer transmitted to the evaluation unit in a coordinate system centered on the respective sensor, but the data transmitted to the evaluation unit should rather be transmitted in a uniform coordinate system for all sensors.

In accordance with a further preferred embodiment of the invention, the values "safe" and "unsafe" associated with each coordinate point of the single images undergo binary encoding by each sensor and the correspondingly encoded sensor data are transmitted to the evaluation unit. The data volume to be transmitted by the sensors to the evaluation unit is minimized by the binary encoding.

The individual images are preferably generated in a Cartesian coordinate system by the sensors and transmitted to the evaluation unit, with the resolution (discretization) in particular being the same in the x and y directions. A Cartesian coordinate system has the advantage with respect to a polar coordinate system that no point in space is particularly preferred. A direct comparison of all coordinate points of the different single images is therefore in particular possible when different sensors with different locations are used.

In accordance with a further preferred embodiment, the invention can be used in a three-dimensional picture sensing. A three-dimensional picture sensing is, for example, advantageous when the machine works at different heights. For example, with a robot arm which is currently working at a height of more than 2 m, a person can move beneath the robot arm without risk. Only when the robot arm is lowered in the direction of the person does a corresponding safety-relevant function have to be triggered. However, conversely, the use of sensors with three-dimensional resolution and a corresponding three-dimensional generation and evaluation of the single images and total images is required. The same applies with a corresponding variable three-dimensional design of the sensed object.

In accordance with a further preferred embodiment of the invention, a classification of the objects sensed in the monitored zone in particular takes place by the evaluation unit into objects belonging to the machine and objects not belonging to the machine. This is necessary when the machine is arranged such that it is likewise sensed by the sensors. Since the machine is by definition always arranged inside the danger zone, a self-triggering of the safety-relevant functions by the machine would take place without the recited classification. For example, machine position data received directly by the machine control can be compared with the position data sensed by the sensor so that the recited classification can be achieved in this manner. The "object data" sensed as belonging to the machine can then remain out of consideration on the checking of the danger zone. Generally, a use of an infrared sensor which only reacts to the heat radiation of persons is, for example, also possible for the classification.

A classification is superfluous if the machine is arranged such that it cannot be sensed by the sensor at least inside the monitored zone. This can be achieved, for example, by use of an area sensor arranged such that the working zone of the machine lies outside the sampling zone of the area sensor. The area sensor must naturally still be arranged such that objects intruding into the monitored zone are reliably sensed.

In accordance with a further preferred embodiment, the slowing down and/or the stopping of the machine is defined as one of the safety-relevant functions. Maximum safety is generally achieved when the machine is brought to a stop as fast as possible on the intrusion of an object into the danger zone. In some cases, however, a slowing down of the speed of movement of the machine can also be sufficient. If information on the movement of the object and/or the machine is available to the evaluation unit, either a reduction of the speed of movement or the complete stopping of the machine can thus be selected. In comparison with a machine programmed only to stop, this has the advantage that a machine stop is really only triggered in necessary cases, whereas a slowing down of the machine motion is sufficient in less urgent cases. It is ensured in this manner that the production process is not disturbed unnecessarily.

The evasive action of the machine with respect to the object can preferably be defined as one of the safety-relevant functions. An evasive action of the machine can frequently be safer than the slowing down or stopping of the machine since a stopping can be achieved less fast than an evasive motion under certain circumstances due to the inertia of the machine. It is, however, necessary for this purpose for information on the direction of movement and on the speed of movement of the object to be known so that the evasive motion takes place in the right direction. It is thereby furthermore also ensured that the production process is not interrupted unnecessarily.

In a further advantageous embodiment of the invention, the triggering of an acoustic and/or visual warning signal is defined as one of the safety-relevant functions. This has the particular advantage that the working procedure of the machine is not interrupted and simultaneously an effective warning is emitted with respect to intruding objects, in particular persons. A combination of the warning signal with one or more of the aforesaid safety-relevant functions is particularly advantageous. Danger zones of different degrees can in particular be defined in this process. If an object intrudes into a zone of a first degree, that is of a relatively low risk, an acoustic or visual signal is triggered which does not yet interrupt the work flow of the machine. If, however, the object intrudes into the danger zone of the second degree, the machine either evades the object or its movement is slowed down and it is possibly stopped completely.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
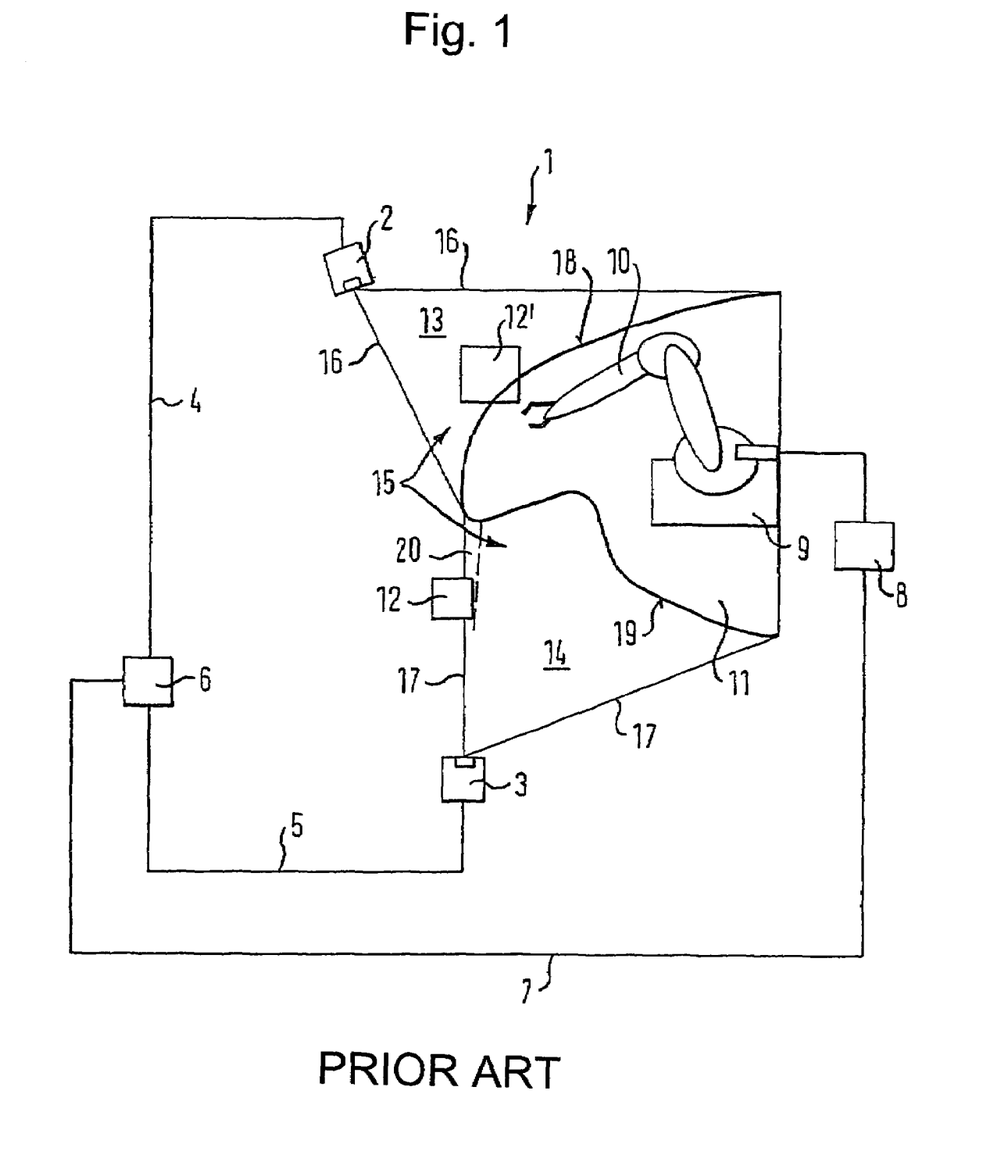
FIG. 1 is a schematic representation of a monitoring apparatus in accordance with the prior art.

FIG. 1 shows a monitoring apparatus 1 in accordance with the prior art with area scanners 2, 3 designed as laser scanners which are each connected to an evaluation unit 6 by leads 4, 5. The evaluation unit 6 is connected via a further lead 7 to a machine control 8 of a machine 9 designed as a robot and including a movable robot arm 10. A safety-relevant function of the machine control 8 can be triggered, for example the machine 9 switched off, by the evaluation unit 6 via the lead 7.

A danger zone 11 which is monitored by the sensors 2, 3 is defined by the movement of the robot arm 10. Objects intruding into the danger zone 11 can be put at risk by the movements of the robot arm 10 so that an intrusion of this kind must, for example, result in a switching off of the machine 9 by the evaluation unit 6. In FIG. 1, both an object 12 which does not breach the danger zone 11 and an object 12' which breaches the danger zone 11 are shown.

In accordance with the prior art of FIG. 1, a protected zone 13, 14 is defined for each sensor 2, 3 which together form a monitored zone 15 of the monitoring apparatus 1. The protected zones 13, 14 are swept over by sampling rays 16, 17 which are transmitted by the sensors 2, 3, with only the two respective sampling rays 16 and 17 (marginal rays) bounding the protected zones 13, 14 being drawn in FIG. 1. The protected zones 13, 14 are bounded by the edges 18, 19 of the danger zone 11 lying in the sampling region of the sensors 2, 3 in addition to by the marginal rays 16, 17.

On every sweep of the protected zones 13, 14, a distance measurement is carried out by the sensors 2, 3 for each sampling ray 16, 17, with the distance measured for each sampling ray being transmitted to the evaluation unit 6. The distance values in the uncritical case, i.e. in the case that no object 12 is arranged inside one of the protected zones 13, 14, are stored as desired values in the evaluation unit 6. The evaluation unit 6 compares the measured values delivered by the sensors 2, 3 with the respective stored desired values and, triggers a safety-relevant function, for example, the switching off of the machine 9, via the machine control 8, if one of the measured values is smaller than the corresponding desired value, as is the case on the intrusion of the object 12' into the protected zone 13.

As can be seen from FIG. 1, however, the object 12 also triggers a corresponding safety-relevant signal, since the protected zone 14 of the sensor 3 is breached by the object 12 although the object 12 does not intrude into the danger zone 11. Since the zone 20 disposed inside the protected zone 14 between the object 12 and the danger zone 11 forms a shadowed area, it cannot be seen into by the sensor 3 so that the machine 9 has to be switched off to maintain the required safety.

In the method in accordance with the prior art, the machine 9 would thus already be switched off due to the object 12 although no breach of the danger zone 11 is present.

The invention will be described more closely in the following with reference to FIGS. 2 and 3. In this process, the same reference numerals as in FIG. 1 are used for elements already shown in FIG. 1.

Figure 2:
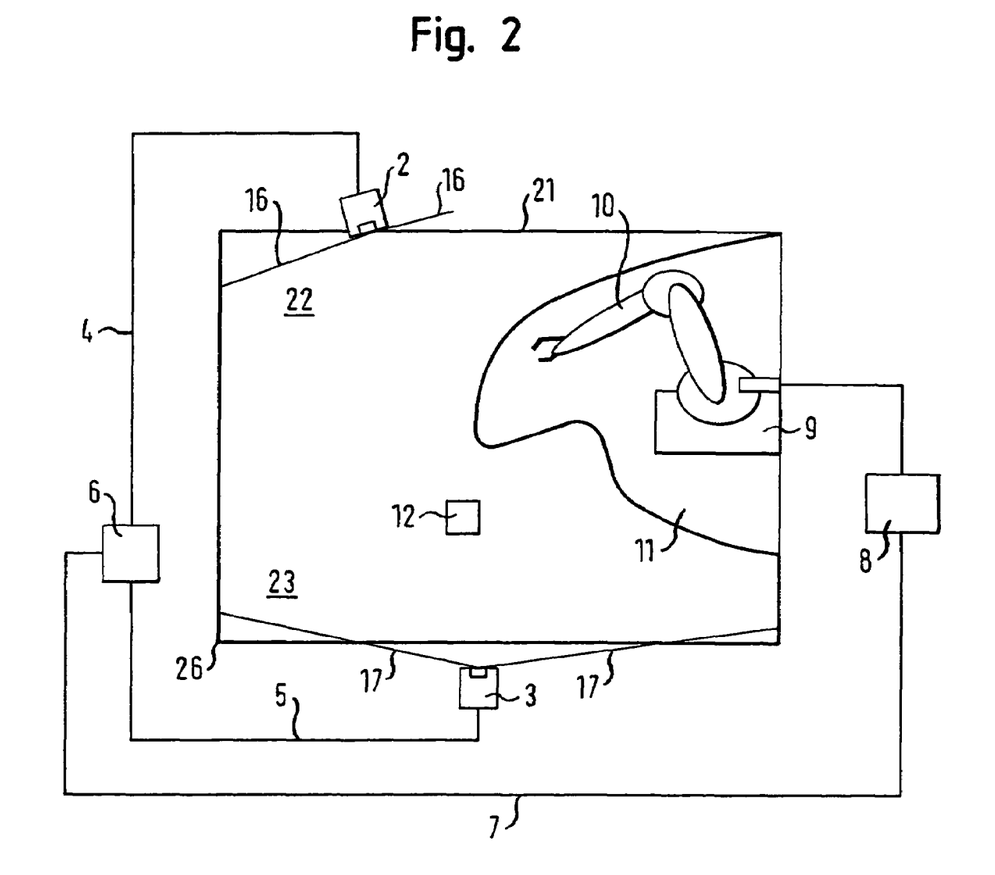
FIG. 2 is a schematic representation of a monitoring apparatus made in accordance with the invention.

In FIG. 2, the object 12 is located in a monitored zone 21 which is monitored by the sensors 2, 3. In contrast to FIG. 1, the sampling angles of the sensors 2, 3 are not restricted to the danger zone 11, but the sampling rays 16, 17 of the sensors 2, 3 rather sweep over respective substantially larger, overlapping sampling zones 22, 23 which include the danger zone 11.

In an initialization phase, the common monitored zone 21 is transmitted to each sensor 2, 3, as is its own position and orientation in space, by the evaluation unit 6. On the basis of these data and of the knowledge of its own sampling angle and its sampling angle resolution, each sensor 2, 3 is in a position to carry out a transformation between the measurement coordinates of its own and a uniform, global coordinate system for all sensors 2, 3 for each coordinate point in the monitored zone 21.

Whereas the area sensors 2, 3 shown in the Figures usually determine their measured values (distance values) in polar coordinates, a Cartesian coordinate system can be used as the uniform coordinate system whose zero point lies, for example, in a corner 26 of the monitored zone. Each sensor 2, 3 is thus in a position to transform the measured data determined in its own coordinate system directly into the coordinate system common to all sensors 2, 3.

Figure 3A:
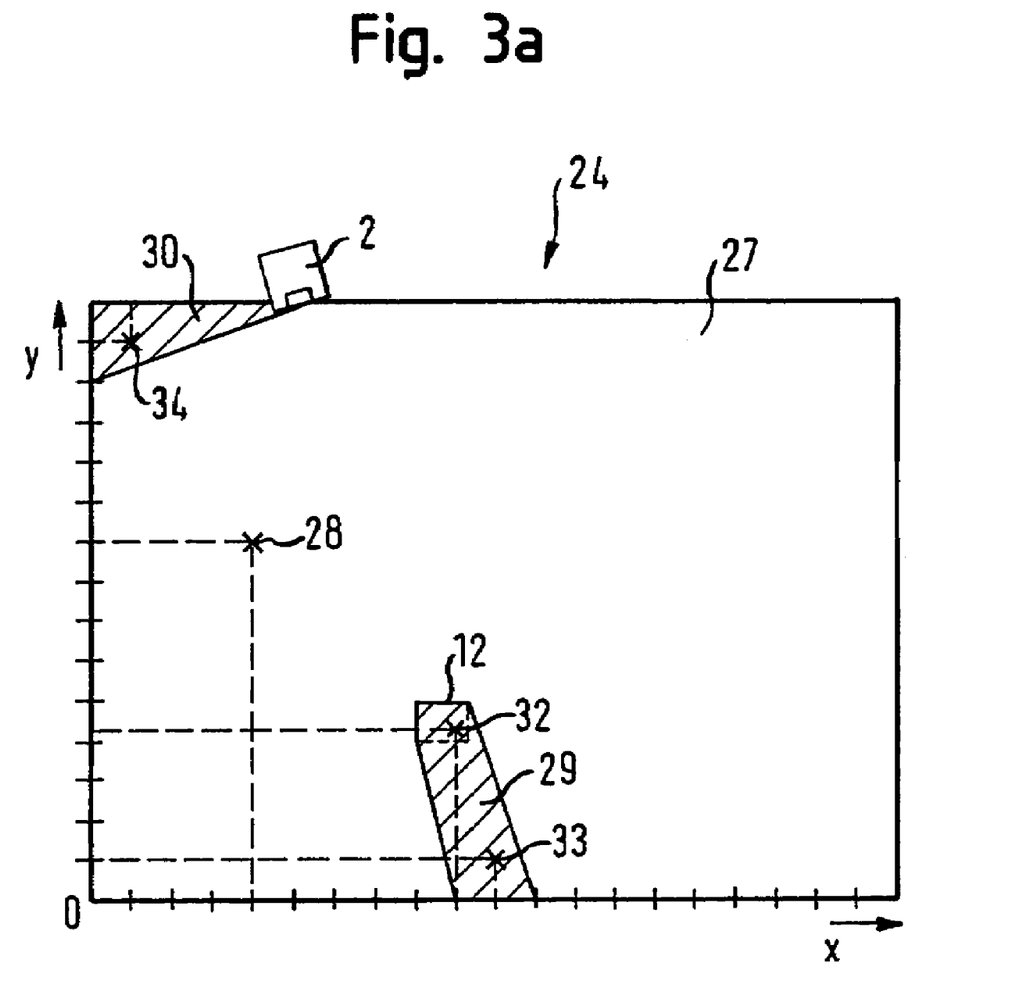
FIGS. 3a-3d are schematic representations of the basic procedure of the sensor data superimposition in accordance with the invention.
Figure 3B:
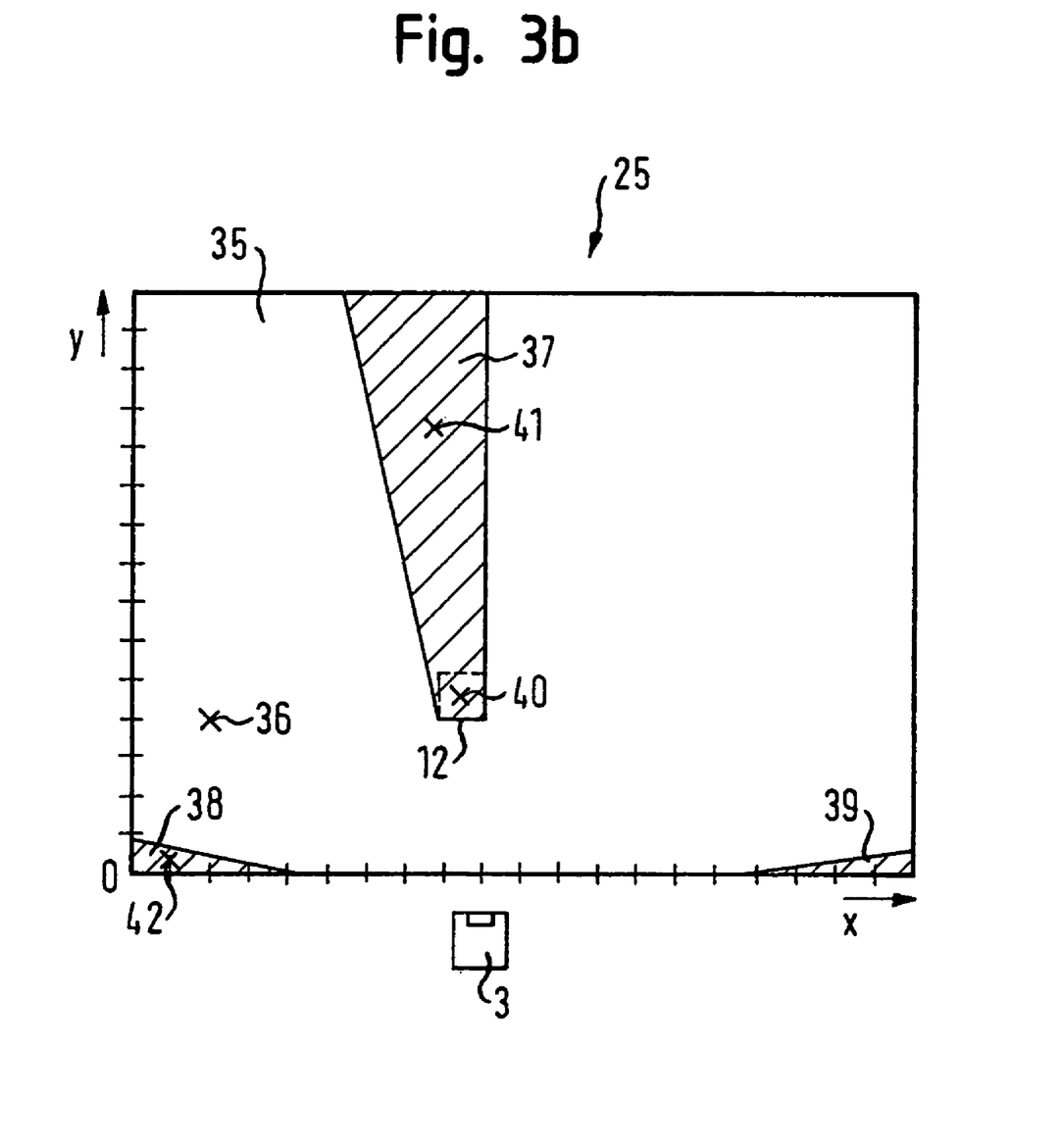

Each of the sensors 2, 3 generates a single digital image 24, 25 of the total monitored zone 21, as is shown in FIGS. 3a) and 3b), on every sampling, i.e. on every sweep over its sampling zone 22, 23. For this purpose, all the coordinate points of the common coordinate system recognized as free by the respective sensor 2, 3 during a sampling are flagged as "safe", whereas all remaining coordinate points are flagged as "unsafe". These coordinate points flagged as "unsafe" are thus both coordinate points of the monitored zone 21 at which there actually is an object 12 and coordinate points which cannot be seen into by the respective sensor 2, 3 and are thus located in the "shadow" of the object 12 for the respective sensor 2, 3.

The corresponding individual image 24 generated by the sensor 2 is shown in FIG. 3a). The sensor 2 is likewise shown in FIG. 3a) for clarification.

The single image 24 includes a "safe" zone 27 shown in white which contains the coordinate points flagged as "safe" by the sensor 2. A coordinate point 28 representative for all "safe" coordinate points is emphasized in FIG. 3a).

The single image 24 furthermore includes two zones 29, 30 which are shown as hatched and which each comprise the coordinate points flagged as "unsafe" by the sensor 2. It can be seen from FIG. 3*a*) that such unsafe coordinate points flag either the position of an object 12 sensed in the monitored zone 21 or zones which cannot be seen into by the sensor 2. An unsafe coordinate point 32 is thus drawn as a representative in FIG. 3*a*) which coincides with the position of the object 12 indicated by a broken line, whereas a further coordinate point 33 is flagged as unsafe since it lies in the "shadow" of the object 12 for the sensor 2 and can therefore not be seen into. The zone 30 can, in contrast, not be seen into by the sensor 2 since it lies outside its sampling region 22 so that the coordinate points 34 lying in the zone 30 are also flagged as unsafe.

A single image 25 generated by the sensor 3 is shown in a corresponding manner in FIG. 3*b*) and includes a "safe" zone 35 shown in white with coordinate points 36 flagged as safe and three unsafe regions 37, 38, 39 shown as hatched with coordinate points 40, 41, 42 flagged as unsafe.

Figure 3C:
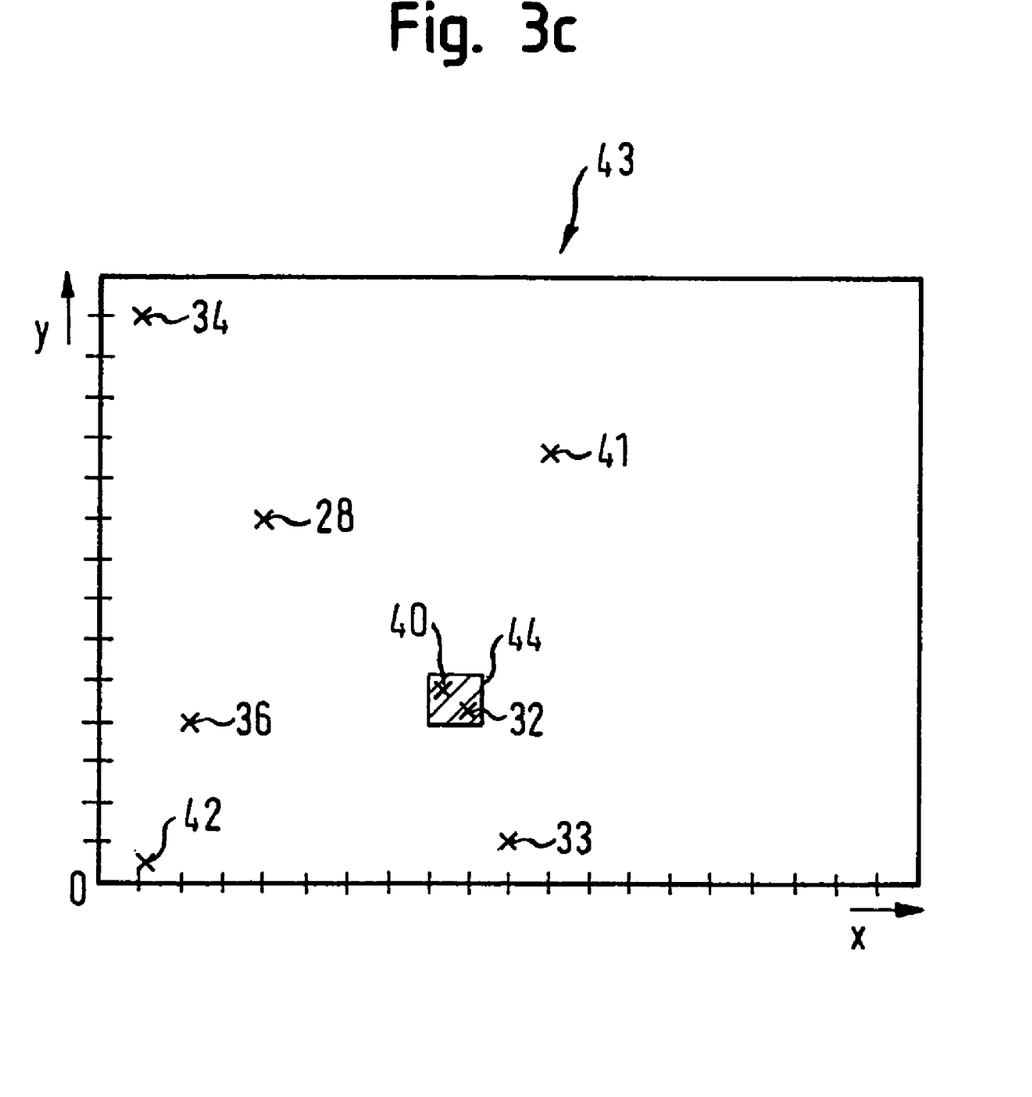

The single images 24, 25 flagged in this manner are transmitted by the sensors 2, 3 to the evaluation unit 6 which superimposes the single images 24, 25 to form a resulting total image 43, which is shown in FIG. 3*c*), in accordance with the common coordinate system. Those coordinate points of the total image 43 are flagged as safe which are flagged as safe in at least one of the single images 24, 25 transmitted by the sensors 2, 3, whereas all other coordinate points of the total image 43 are flagged as unsafe. In accordance with FIG. 3*c*), the object 12 is sensed without a "shadow" in its correct shape in an unsafe zone 44 shown as hatched due to the coordinate points flagged as unsafe.

In a next step, the generated total image 43 is superimposed with the danger zone 11 (see FIG. 3*d*)) by the evaluation unit 6 and a check is made whether a pre-set minimum number of coordinate points flagged as unsafe is contained inside the danger zone 11, i.e. whether an overlap of the unsafe zone 44 with the danger zone 11 is present. In this process, the danger zone 11 is advantageously likewise present in the same coordinate system as the individual images 24, 25 and the total image 43 in the evaluation unit 6 in order to allow a simple superimposition with the total image 43 in this manner. Only when a pre-determined minimum overlap of unsafe coordinate points of the total image 43 and the danger zone 11 is present is a corresponding safety-relevant function, for example a switching off of the machine 9, triggered by the evaluation unit 6.

Figure 3D:
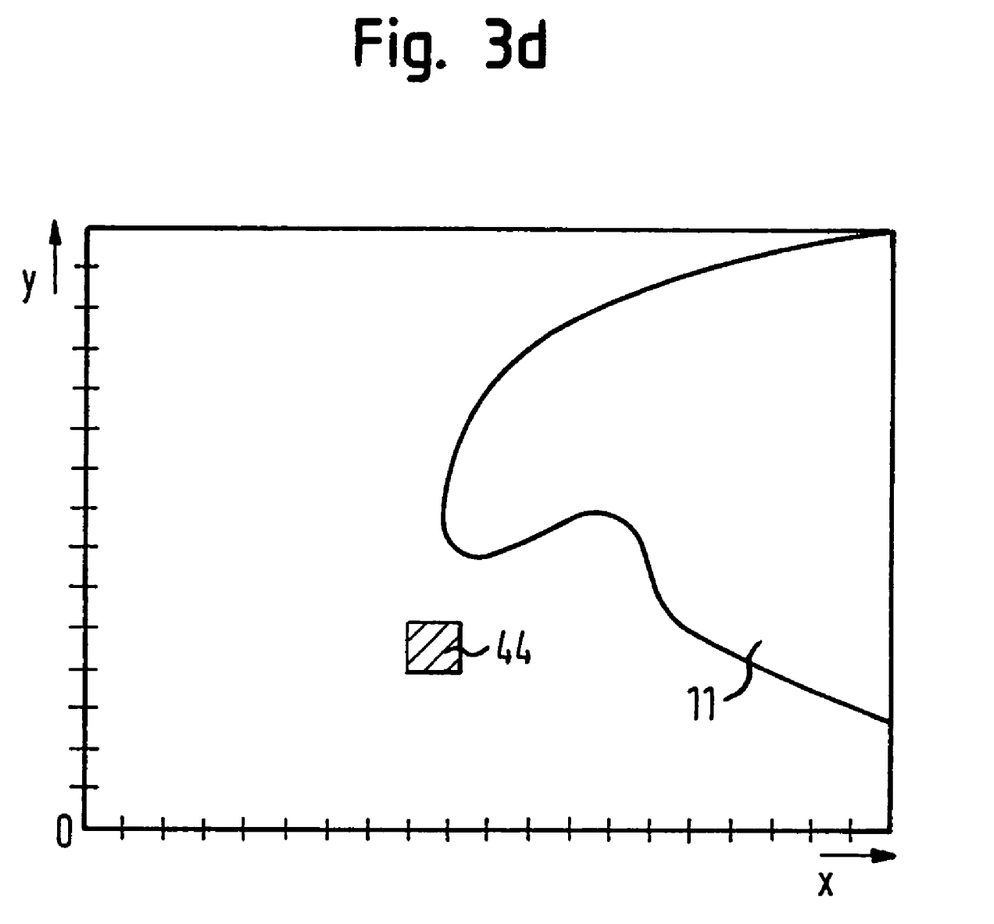

As can be seen from FIG. 3*d*), there is no overlap between the zone 44 and the danger zone 11 in the present case so that it is recognized in accordance with the invention that the object 12 does not breach the danger zone. Contrary to the prior art described with reference to FIG. 1, an unnecessary operational interruption of the machine 9 is thus prevented by the invention.

The representation in accordance with FIG. 3*d*) can in particular be displayed on a display unit for monitoring by a monitoring person. Advantageously, the safe and the unsafe coordinate points or the zones defined thereby at the display unit are shown in different colors. The danger zone can also be marked in a color distinct therefrom so that the monitoring person can directly recognize when a breach of the danger zone is present or is directly imminent, for example.

The description of the invention is merely exemplary in nature and, thus, variations that do not depart from the gist of the invention are intended to be within the scope of the invention. Such variations are not to be regarded as a departure from the spirit and scope of the invention.

Reference Numeral List

1 monitoring apparatus
2 sensor
3 sensor
4 lead
5 lead
6 evaluation unit
7 lead
8 machine control
9 machine
10 robot arm
11 danger zone
12, 12' objects
13 protected zone
14 protected zone
15 monitored zone
16 sampling rays
17 sampling rays
18 edge of the danger zone
19 edge of the danger zone
20 shadow zone
21 monitored zone
22 sampling zone
23 sampling zone
24 single image
25 single image
27 safe zone
28 coordinate point
29 unsafe zone
30 unsafe zone
32 coordinate point
33 coordinate point
34 coordinate point
35 safe zone
36 coordinate point
37 unsafe zone
38 unsafe zone
39 unsafe zone
40 coordinate point
41 coordinate point
42 coordinate point
43 total image
44 unsafe zone

What is claimed is:

1. A method for detecting an object inside a monitored zone, in which at least two sensors respectively monitor at least a part of the monitored zone, each sensor having a processing unit, comprising:

each sensor generating a single digital image of the total monitored zone with the single images of all sensors being generated in a uniform coordinate system common to all sensors;

said processing unit of each sensor flagging as "safe" those coordinate points of said single image previously generated by the respective sensor which are recognized as free of the object and flagging as "unsafe" all other coordinate points of said single image previously generated by the respective sensor, wherein said flagging step is separate from said step of generating said single image;

transmitting the generated and flagged single images to an evaluation unit, where the evaluation unit is separate from all of the processing units of said sensors;

superimposing the transmitted single images using the evaluation unit to form a resulting total image in accordance with their common coordinate system, wherein coordinate points of the total image are flagged as "safe", which correspond to coordinate points flagged as "safe" in at least one of the single images, and wherein any remaining coordinate points of the total image are flagged as "unsafe"; and determining coordinates of the object using the coordinate points flagged as "unsafe" in the total image.

2. A method in accordance with claim 1, further comprising superimposing the resulting total image with a danger zone fixed by the evaluation unit and in particular changing dynamically; and in that a safety-relevant function is triggered when at least a pre-determined number of coordinate points flagged as "unsafe" is determined inside the danger zone.

3. A method in accordance with claim 2, wherein the triggering of the safety-relevant function comprises a slowing down or stopping of a machine.

4. A method in accordance with claim 2, wherein the triggering of the safety-relevant function comprises an evasion of the machine with respect to the object.

5. A method in accordance with claim 2, wherein the triggering of the safety-relevant function comprises a transmission of a visual or acoustic warning signal.

6. A method in accordance with claim 1, wherein the single images of the different sensors each have the same discretization.

7. A method in accordance with claim 1, further comprising defining the monitored zone for each sensor in an initialization phase and each sensor's own position is fixed with respect to the monitored zone.

8. A method in accordance with claim 1, wherein the values "safe" and "unsafe" associated with each coordinate point of the single images undergo binary encoding by each sensor and the correspondingly encoded sensor data are transmitted to the evaluation unit.

9. A method in accordance with claim 1, wherein the individual images are generated in a Cartesian coordinate system by the sensors and are transmitted to the evaluation unit; and wherein discretization is in particular the same in the x and y directions.

10. A method in accordance with claim 1, wherein the picture sensing or the generation or the evaluation of the single images or of the total image takes place three-dimensionally.

11. A method in accordance with claim 2, wherein a classification of the objects sensed in the monitored zone distinguishes objects belonging to the machine and objects not belonging to the machine; and in that the safety-relevant function is not triggered by the sensing of objects belonging to a machine in the monitored zone.

12. An apparatus for detecting an object inside a monitored zone, comprising:

at least two sensors for a respective monitoring of at least a part of the monitored zone, each sensor generating a single digital image of the total monitored zone with said single images being generated in a uniform coordinate system common to all of the sensors, and having a processing unit that flags as "safe" coordinate points of the single image generated by the respective sensor which it recognizes as free of the object; and an evaluation unit, which is separate from all of the sensors, that receives the single images from each sensor, that superimposes the transmitted single images in accordance with their common coordinate system to form a resulting total image, that flags as "safe" those coordinate points of the total image which are flagged as "safe" in at least one of the single images transmitted by the sensors, that flags as "unsafe" all other coordinate points of the total image and that determines coordinates of the object from the coordinate points flagged as "unsafe" in the total image.

* * * * *